US010073794B2

(12) United States Patent
Thomas et al.

(10) Patent No.: US 10,073,794 B2
(45) Date of Patent: Sep. 11, 2018

(54) MOBILE APPLICATION BUILDER PROGRAM AND ITS FUNCTIONALITY FOR APPLICATION DEVELOPMENT, PROVIDING THE USER AN IMPROVED SEARCH CAPABILITY FOR AN EXPANDED GENERIC SEARCH BASED ON THE USER'S SEARCH CRITERIA

(71) Applicant: Sprinklr, Inc., New York, NY (US)

(72) Inventors: Ragy Thomas, New York, NY (US); Pavitar Singh, New York, NY (US)

(73) Assignee: SPRINKLR, INC., New York, NY (US)

(*) Notice: Subject to any disclaimer, the term of this patent is extended or adjusted under 35 U.S.C. 154(b) by 0 days.

(21) Appl. No.: 15/200,911

(22) Filed: Jul. 1, 2016

(65) Prior Publication Data
US 2017/0109141 A1    Apr. 20, 2017

Related U.S. Application Data

(60) Provisional application No. 62/242,548, filed on Oct. 16, 2015.

(51) Int. Cl.
*G06F 9/44*    (2018.01)
*G06F 13/10*    (2006.01)
(Continued)

(52) U.S. Cl.
CPC .......... *G06F 13/102* (2013.01); *G06F 9/4451* (2013.01); *G06F 9/44521* (2013.01);
(Continued)

(58) Field of Classification Search
CPC .................................................. G06F 13/102
(Continued)

(56) References Cited

U.S. PATENT DOCUMENTS 6,094,829 A    4/2000    Li
6,601,234 B1 *    7/2003    Bowman-Amuah ..... G06F 8/24
705/7.37
(Continued)

FOREIGN PATENT DOCUMENTS

EP    2698955    2/2014
WO    WO2010/008685    1/2010
(Continued)

OTHER PUBLICATIONS

Rosa et al, "Smart Composition of Reusable Software Components in Mobile Application Product Lines ", ACM, pp. 45-49, 2011.*
(Continued)

*Primary Examiner* — Anil Khatri
(74) *Attorney, Agent, or Firm* — Jennifer Hayes; Nixon Peabody LLP

(57) ABSTRACT

A mobile "Applications Builder" established on the user's mobile handheld device creates a bucket or container for mobile applications (Apps) and selectively downloads applications that are appropriate to a search initiated by the consumer. The user search inputs are used as a contextualization input to identify the relevant product, service or brand and identify the Apps of companies that fall within the search parameters. The identified Apps are downloaded into a bucket and made available to the user to enable his search using tokens or logos for the products, services and brands he is interested in. Users can perform searches using scanned visual logos or visual tokens scanned. Visual tokens and logos contained within the bucket can be used to reduce the customer's effort during the search, while providing enlarged access to related items for consideration by the user as a marketing tool.

18 Claims, 4 Drawing Sheets

(51) Int. Cl.
  *G06F 17/30* (2006.01)
  *G06F 9/445* (2018.01)
  *G06F 8/61* (2018.01)
(52) U.S. Cl.
  CPC ............... *G06F 17/30* (2013.01); *G06F 8/61* (2013.01); *G06F 9/44594* (2013.01)
(58) Field of Classification Search
  USPC ................. 717/101–102, 104–109, 120–122
  See application file for complete search history.

(56) References Cited

U.S. PATENT DOCUMENTS

| | | | |
|---|---|---|---|
| 7,308,418 B2 | 12/2007 | Malek et al. | |
| 7,761,848 B1* | 7/2010 | Chaffin | G06F 8/20 717/106 |
| 7,930,302 B2 | 4/2011 | Bandaru et al. | |
| 8,225,271 B2* | 7/2012 | Eldridge | G05B 15/02 717/100 |
| 8,266,148 B2 | 9/2012 | Guha et al. | |
| 8,584,082 B2* | 11/2013 | Baird | G06F 8/34 715/762 |
| 8,635,281 B2 | 1/2014 | Kelly | |
| 8,645,912 B2* | 2/2014 | Welchman | G06F 3/0481 715/704 |
| 8,683,433 B2* | 3/2014 | Nayak | G06F 8/71 717/120 |
| 8,688,726 B2 | 4/2014 | Mahajan et al. | |
| 8,694,520 B1 | 4/2014 | Krishnakumar et al. | |
| 8,707,259 B2* | 4/2014 | Trofin | G06F 8/36 717/120 |
| 8,732,669 B2* | 5/2014 | Valdiviezo Basauri | G06F 11/3608 717/104 |
| 8,819,659 B2* | 8/2014 | Ramer | G06F 17/30398 455/445 |
| 8,832,644 B2* | 9/2014 | Hirsch | G06F 8/20 717/107 |
| 8,924,914 B2* | 12/2014 | Boeckenhauer | G06F 8/30 717/100 |
| 8,978,006 B2* | 3/2015 | Hirsch | G06F 8/71 717/107 |
| 8,996,371 B2 | 3/2015 | Hurvitz et al. | |
| 9,002,892 B2 | 4/2015 | Benyamin et al. | |
| 9,116,983 B2 | 8/2015 | Ameri-Yahia et al. | |
| 9,223,831 B2 | 12/2015 | Baker et al. | |
| 9,448,776 B1* | 9/2016 | Sankaran | G06F 17/30893 |
| 9,672,032 B2* | 6/2017 | Zhou | G06F 8/76 |
| 9,696,967 B2* | 7/2017 | Balasubramanian | G06F 8/30 |
| 2001/0027472 A1 | 10/2001 | Feng | |
| 2006/0053156 A1 | 3/2006 | Kaushansky et al. | |
| 2008/0249764 A1 | 10/2008 | Huang et al. | |
| 2009/0319342 A1 | 12/2009 | Shilman et al. | |
| 2010/0114654 A1 | 5/2010 | Lukose et al. | |
| 2010/0131563 A1 | 5/2010 | Yin | |
| 2010/0169304 A1 | 7/2010 | Hendrickson et al. | |
| 2010/0235313 A1 | 9/2010 | Rea et al. | |
| 2011/0191372 A1 | 8/2011 | Kaushansky et al. | |
| 2012/0036007 A1 | 2/2012 | Robertson et al. | |
| 2012/0116868 A1 | 5/2012 | Chin et al. | |
| 2012/0158489 A1 | 6/2012 | Benyamin et al. | |
| 2012/0203584 A1 | 8/2012 | Mishor | |
| 2012/0215625 A1 | 8/2012 | Ramer et al. | |
| 2012/0246033 A1 | 9/2012 | Keiser | |
| 2012/0246054 A1 | 9/2012 | Sastri | |
| 2012/0290340 A1 | 11/2012 | Ramanujam et al. | |
| 2012/0290938 A1 | 11/2012 | Subbarao et al. | |
| 2012/0296845 A1 | 11/2012 | Andrews et al. | |
| 2013/0080264 A1 | 3/2013 | Umeda | |
| 2013/0103385 A1 | 4/2013 | Ghosh et al. | |
| 2013/0124653 A1 | 5/2013 | Vick | |
| 2013/0132851 A1 | 5/2013 | Konopniki et al. | |
| 2013/0166379 A1 | 6/2013 | Ehindero et al. | |
| 2013/0238356 A1 | 9/2013 | Torii | |
| 2013/0246430 A1 | 9/2013 | Szucs et al. | |
| 2013/0263019 A1 | 10/2013 | Castellanos et al. | |
| 2013/0311323 A1 | 11/2013 | Stoll et al. | |
| 2013/0339126 A1 | 12/2013 | Cui et al. | |
| 2014/0025749 A1 | 1/2014 | Glowacki | |
| 2014/0025758 A1 | 1/2014 | Glowacki | |
| 2014/0056526 A1 | 2/2014 | Scipioni | |
| 2014/0136323 A1 | 5/2014 | Zhang et al. | |
| 2014/0188897 A1 | 7/2014 | Baker et al. | |
| 2014/0337320 A1 | 11/2014 | Hernandez et al. | |
| 2015/0106304 A1 | 4/2015 | Gupta et al. | |
| 2015/0112753 A1 | 4/2015 | Suvarna | |
| 2015/0186790 A1 | 7/2015 | Ehlen et al. | |
| 2017/0148038 A1 | 5/2017 | Thomas et al. | |
| 2017/0243125 A1 | 8/2017 | Thomas et al. | |
| 2017/0300564 A1 | 10/2017 | Feng et al. | |

FOREIGN PATENT DOCUMENTS

| | | |
|---|---|---|
| WO | WO2013/101812 A1 | 7/2013 |
| WO | WO2013/158790 A1 | 10/2013 |
| WO | WO2013/158840 A1 | 10/2013 |
| WO | WO2013/177230 A1 | 11/2013 |
| WO | WO2014/143018 A1 | 9/2014 |

OTHER PUBLICATIONS

Sung et al, "Mobile Application Development Classes for the Mobile Era", ACM, pp. 141-146, 2014.*

Christi et al, "Using mobile technology for inter-organisational collaboration and end-customer integration", ACM, pp. 1-8, 2013.*

Bharat et al, "Building Distributed, Multi-User Applications by Direct Manipulation", ACM, pp. 71-81, 1994.*

Meskens et al, "Plug-and-Design: Embracing Mobile Devices as Part of the Design Environment", ACM, pp. 149-153, 2009.*

Koziokas et al, "Usability Testing of Mobile Applications: Web vs. Hybrid Apps", ACM, pp. 1-2, 2017.*

Zhan et al, "MCKit: a Mobile App for Conferences", ACM, pp. 59-64, 2014.*

Yang et al, "Personalized Mobile Application Discovery", ACM, pp. 49-54, 2014.*

* cited by examiner

MOBILE APPLICATION BUILDER PROGRAM AND ITS FUNCTIONALITY FOR APPLICATION DEVELOPMENT, PROVIDING THE USER AN IMPROVED SEARCH CAPABILITY FOR AN EXPANDED GENERIC SEARCH BASED ON THE USER'S SEARCH CRITERIA

PRIORITY

The present application claims priority to U.S. Provisional Patent App. No. 62/242,548, filed Oct. 16, 2015, entitled "Mobile Application Builder and Use," the entirety of which is hereby incorporated by reference.

BACKGROUND

1. Field

The present disclosure relates generally to automating and improving search capabilities of customers and providing them access to choices based on their search criteria and more specifically to providing improved optical searching using tokens and logos with handheld devices.

2. Related Art

The fast growth of mobile handheld communication devices (MHCD) over the last few years has created new opportunities in the fields of advertising, marketing and sales. One of the areas of advancement has been in the area of searching the internet. The trend for shopping is moving from in-store to internet and is being fueled in part by the ease of searching for goods and services and brands using the MHCDs. Companies like Amazon and Alibaba have made internet shopping a main-steam event, especially for the younger generation of web-savy shoppers.

Previously, internet searches were done using key-words, but that is changing now with the inclusion of cameras and scanners on the MHCDs. These provide an easier way to search for products and services by scanning optical codes, tokens and logos. A number of application programs (APPs) have sprung up that provide the capability to the consumer to search using the logos and optical tokens. Currently most companies have one or more mobile APPs that enable visual scan. Typically, the APP will also have the logos of the brand or product with it. In a typical search process the APP has to be downloaded on to the MHCD and enabled on the MHCD prior to the scan. The optical token or logo is photographed or scanned by the MHCD to initiate the search. The APPs decodes the token and over the net accesses the specific brand/product/service web portal to download the web page on to the MHCD for the user to study and evaluate. Since each company or brand has its own mobile APPs and Logo/token covering individual products this process becomes difficult for the user to conduct a generic search for a product or service availability.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the invention relate to making search more meaningful for the consumer by enabling the processing power of the MHCD by taking the search criteria input and collecting into a bucket on the MHCD logos and tokens of products, services and brands meeting the search criteria, thus providing the consumer with information on the brand, product and service that he is currently requesting, and also provide additional search capability using optical search for similar products, services and brands available on the web, which meet the original criteria for the search.

In accordance with one aspect of the invention, a mobile communication device is disclosed that includes a program storage memory for storing program execution code, wherein the program execution code includes an APP builder program, wherein the APP builder program is configured to create a container for mobile applications and selectively download applications related to search initiated by a user of the mobile communication device; a data storage memory for storing data generated during execution of the APP builder program; a communication module and a wireless connection communicatively coupled to the communication module; and a processor communicatively coupled to the program storage memory and the data storage memory.

The mobile communication device may further include a display buffer and a display, wherein the display buffer is communicatively coupled to the display.

The mobile communication device may further include a location identification unit for identifying the location of the mobile communication device.

The mobile communication device may further include an I/O module for receiving input from a user and providing output to the user.

The mobile communication device may further include a common high-speed bus system, wherein the common high-speed bus system communicably couples the component units of the mobile communication device.

In accordance with another aspect of the invention, a method for downloading an APP builder program to a mobile handheld communication device is disclosed that includes connecting to an APP supplier; downloading an APP-builder program from the APP supplier to the mobile handheld communication device; storing the APP builder program into memory of the mobile handheld communication device; and executing and instantiating the APP builder program, wherein the APP builder program is configured to create a container for mobile applications and selectively download applications related to search initiated by a user of the mobile communication device.

Executing the APP builder program may include generating a consumer preference storage area in memory to store consumer preference data for a user of the mobile handheld communication device.

The method may further include collecting and compiling consumer preference data of the user using the APP builder program; and storing the consumer preference data of the user in the consumer preference storage area.

The method may further include pre-allocating a temporary memory space for use during search activity by the user.

The temporary memory space may be an APP container space.

The connecting to the APP supplier may be over a wireless connection.

The APP builder program may be stored in program storage memory.

The method may further include continuously updating the consumer preference data stored in the consumer preference storage area.

The updating may be done based on user inputs and current and historic actions of the user.

In accordance with a further aspect of the invention, a method is disclosed that includes receiving search input by the user, wherein the search input comprises at least one of a picture, visual product scan, service token scan or a brand logo scan; connecting to a web portal corresponding to a supplier related to the search input; downloading a website corresponding to the supplier from the web portal; displaying the website on the display screen of the mobile handheld communication device; extracting search parameters from the search input; combining extracted search parameters from the search input with customer preference data to generate a contextualized search criteria; combining the contextualized search criteria with location information of the user to identify a set of brand and product portals; connecting to the set of brand and product portals; requesting APPS to be downloaded from the set of brand and product portals into the temporary APP container location; and presenting logos and tokens from the downloaded APPs to the user to enable an expanded search capability to the user that meet the search parameters.

The method may further include allowing the user to use the APPs presented to the user from the temporary APP container location once the search is completed by the user.

The method may further include updating the customer preference data using the search parameters.

The method may further include deleting the data in the temporary APP container after the search is completed.

The method may further include storing the consumer preference data in memory.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Figure 1:
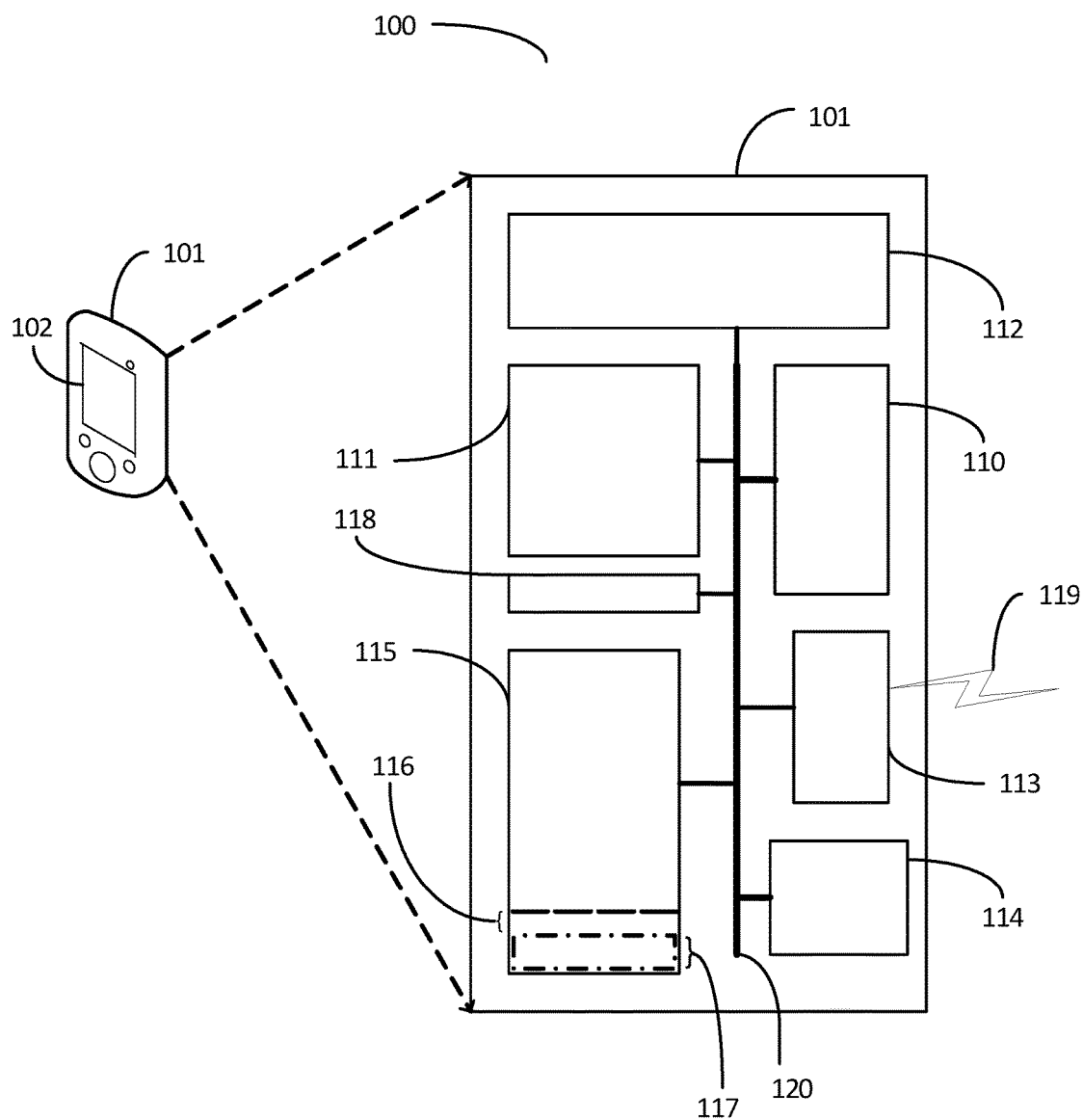
FIG. 1 is a block diagram of the mobile handheld communication device (MHCD) with an APP builder and APP container instantiated thereon for search using the power of a processor on the MHCD according to an embodiment of the invention.

Embodiments of the invention relate to a mobile "Applications Builder" established on the user's mobile handheld device. The applications builder creates a bucket or container for mobile applications (Apps) and selectively downloads applications that are appropriate to any search initiated by the consumer. The user search inputs are used as a contextualization input to identify the relevant product, service or brand and identify the Apps of companies that fall within the search parameters. The identified Apps are downloaded into the bucket and made available to the user to enable searching using tokens or logos for the products, services and brands that the user is interested in. Embodiments of the invention allow for searches using scanned visual logos or visual tokens. Visual tokens and logos contained within the bucket can be used to reduce the mobile handheld communication device (MHCD) user's searching effort, while providing enlarged access to related items for consideration by user as a marketing tool.

Embodiments of the invention also relate to providing the consumer easy access to search within related product services and brands that interest the user. Recent growth of MHCDs and the improvements in their performance by addition/integration of cameras and scanners etc., have made the public use of these devices universal. The ability to cross-compare product features from the same brand and even multiple brands have given the consumer power to do comparison shopping using these devices and make intelligent purchase decisions for products and services.

Embodiments of the invention create a consumer APP that is a mobile APP builder which generates and populates a container or bucket for APPs on the MHCD. When a consumer searches for a brand or downloads a specific APP, the APP builder looks for the search parameters and product and brand type to identify and generate a customer interest profile for that search. The user search profile generated by the APP-builder is used as a contextualization input to identify the relevant product, service or brand and identify the Apps of companies that fall within the user interest and search criteria. This allows the APP builder to go out and gather APPs of brands and products from the web that fall within the developed search interest criteria and download them into the App container or APP bucket on the MHCD of the user. This provides the user with a group of right usable APPs within the APP container on the MHCD. The user is then presented with the logos and tokens of products he has initiated search on and others having similar characteristics to the products he is searching for from other brands, from within the APP container, enabling him to make easy informed decisions without exiting the search site. The APP builder is also able to provide local availability connections and incentive information to the user to enable accelerated purchase decisions. This further allows the accessed site to hold on to the consumer, improving the customer retention time on site while enabling higher click-through, thereby improving return to the site.

FIG. 1 shows a block representation 100, of a typical mobile handheld communication device 101 having a display 102. The communication device 101 includes a processor 110, a program storage memory 111, a display buffer 112, a communication module 113, an I/O module 114, a data storage memory 115, a location identification unit 118, wireless connection 119 and common high-speed bus system 120.

The processor 110 controls the operations of the MHCD 101 is responsible for, for example, downloading the APP Builder program from a remote server into the program memory 111 for executing and instantiating the APP builder on the MHCD 101, creating storage areas in memory for the APP builder container, executing user searches by coordinating communications of user input to external servers or websites, among other things.

The display buffer 112 is communicably linked to the display 102 of the MHCD 101. The display buffer 112 temporarily stores data that is displayed on the display 102, as understood by those of skill in the art.

The I/O module 114 allows input to and output from the MHCD 101 through various other devices, such as a keyboard, camera, speaker, etc. For example, the user may enter search terms on a keyboard or by taking a picture or scanning logos or other images related to their search using the MHCD's camera, both of which are connected to the I/O module 114.

The program storage memory 111 stores programs that can be run on the MHCD 101, including, for example, the APP Builder program code and code needed for the user to execute a search query.

The data storage memory 115 stores the program execution results both received from external sources and manipulated data during program execution. For example, the data storage memory 115 may store the program execution results related to the APP Builder. The data storage memory 115 may also store the program execution result generated related to applications that permit the user to execute a search query.

The location identification unit 118 identifies the location of the MHCD 101 and, in one embodiment, is a global positioning system (GPS) chip.

The common high-speed bus system 120, communicably couples all the component units of the MHCD 101. The common high-speed bus system 120 enables communication activities and execution of programs.

The communication module 113 is enabled for communicating to the outside world including via wireless connection 119. In one embodiment, the communications module 113 is a cellular and/or Wi-Fi chipset and the wireless connection 119 is an antenna and related circuitry.

Figure 2:
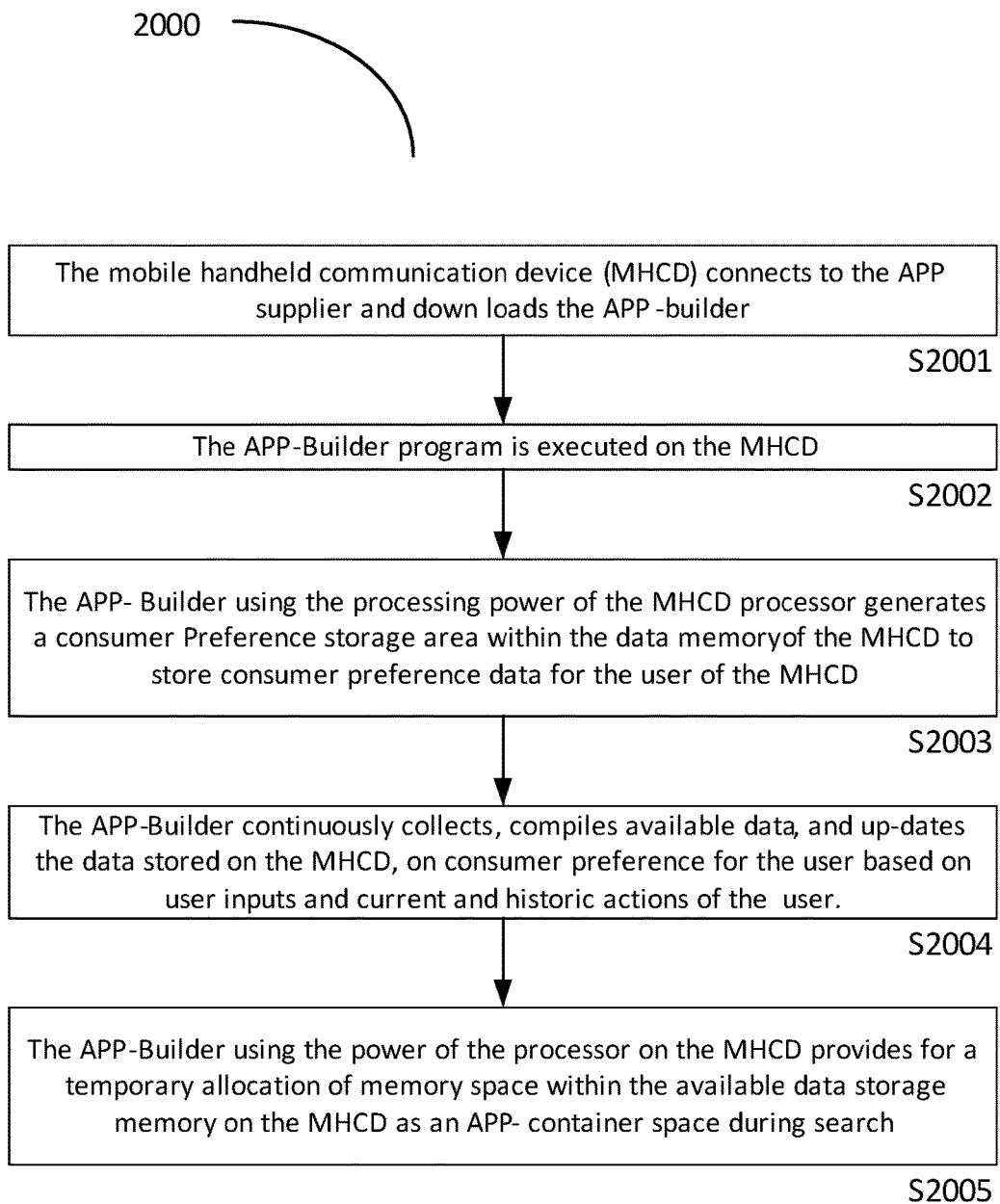
FIG. 2 is a flow chart of an instantiation of the APP builder on the MHCD according to an embodiment of the invention.

FIG. 2 illustrates a method 2000 for downloading and installation of the enabler APP builder program.

The method 2000 begins with the MHCD connecting to an APP supplier and downloading the APP builder program into memory on the MHCD (block S2001). In one embodiment, the MHCD 101 connects to the App supplier over the wireless connection 119. In one embodiment, the APP builder program is stored in the program storage memory 111.

The APP builder program downloaded is then executed and instantiated on the MHCD (block S2002).

The execution of the APP builder generates a consumer preference storage area to store consumer preference data for the user of the MHCD (block S2003). In one embodiment, the processor 110 generates the consumer preference data for the user. In one embodiment, the processor 110 of the MHCD 101 creates a consumer preference storage area 116 on the MHCD 101. In one embodiment, data storage memory 115 includes a consumer preference storage area 116, and the generated consumer preference data is stored in the consumer preference storage area 116.

The APP builder program collects and compiles consumer preference data of the user from all available sources and stores this data in the consumer preference storage area (block S2004). In one embodiment, this data is stored in the consumer preference storage area 116 of the data memory 115. The instantiated APP builder program also continuously updates the consumer preference data stored in the consumer preference storage area 116 within the data memory 115 of the MHCD 101. This update is done based on user inputs and current and historic actions of the user.

The APP builder provides for pre-allocation of a temporary memory space as an APP container space for use during search activity by the user (block S2005). In one embodiment, the APP builder uses the power of the processor 110 on the MHCD to pre-allocate the temporary memory space as the APP container space 117. In one embodiment, the temporary space—APP container space 117—is within the available data storage memory 115 on the MHCD 101.

Figure 3:
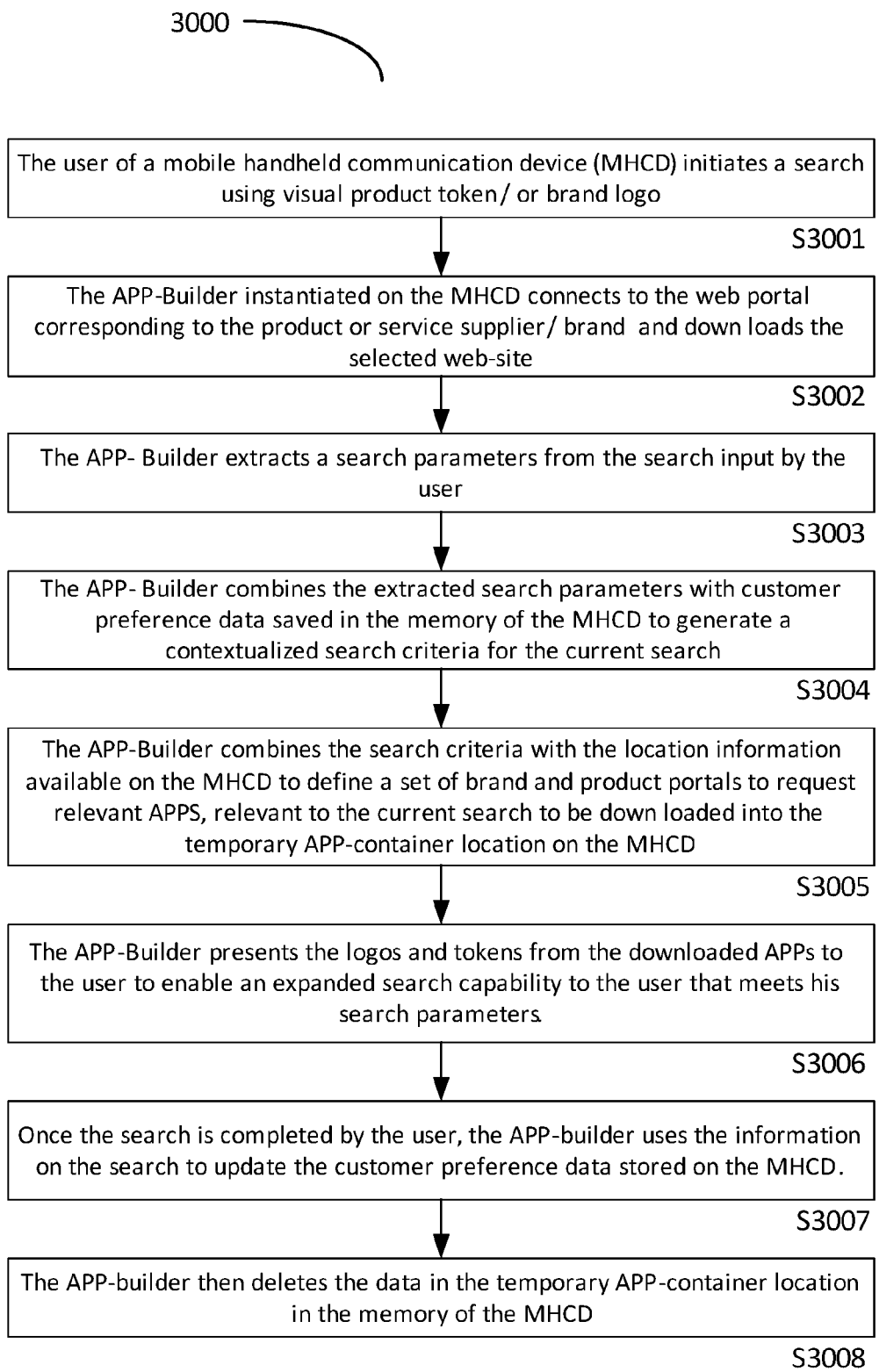
FIG. 3 is a flow chart of a search method using the APP builder and APP container according to an embodiment of the invention.

FIG. 3 illustrates a method 3000 for performing a visual search on the MHCD.

The method begins with the user of a mobile handheld communication device (MHCD) initiating a search by taking a picture or scanning a visual product or service token or brand logo using the built-in camera of the MHCD (block S3001). In one embodiment, the built-in camera is part of the input module 114.

The APP builder instantiated on the MHCD connects to the web portal corresponding to the product or service supplier/brand and downloads the selected website from the web portal and displays it on the display screen of the MHCD (block S3002).

The APP builder extracts search parameters from the search input on the MHCD by the user (block S3003). In one embodiment, the APP builder uses the power of the processor 110 to extract the search parameters from the search input.

The APP builder combines the extracted search parameters with customer preference data to generate a contextualized search criteria for the current search by the user of the MHCD (block S3004). In one embodiment, the customer preference data is extracted from a consumer storage preference area 116 in the data memory 115 of the MHCD 101, as shown in FIG. 1.

The APP builder combines the search criteria with the location information available on the MHCD to identify a set of brand and product portals to request APPS relevant to the current search to be downloaded into the temporary APP container location (block S3005). In one embodiment, the APPs are downloaded into a temporary APP container location 117 on the MHCD 101, as shown in FIG. 1, over the internet connection via the wireless connection 119.

The APP builder presents the logos and tokens from the downloaded APPs to the user to enable an expanded search capability to the user that meets his search parameters (block S3006). In one embodiment, the logos and tokens related to the downloaded APPs are stored in the APP container 117.

Once the search is completed by the user, using the APPs presented to him from the temporary APP-container, the APP builder uses the information on the search to update the customer preference data stored on the MHCD (block S3007).

Once the search is complete and the update of the customer information is done, the APP builder deletes the data in the temporary APP container in the memory of the MHCD, completing the search process by the user (block S3008).

Figure 4:
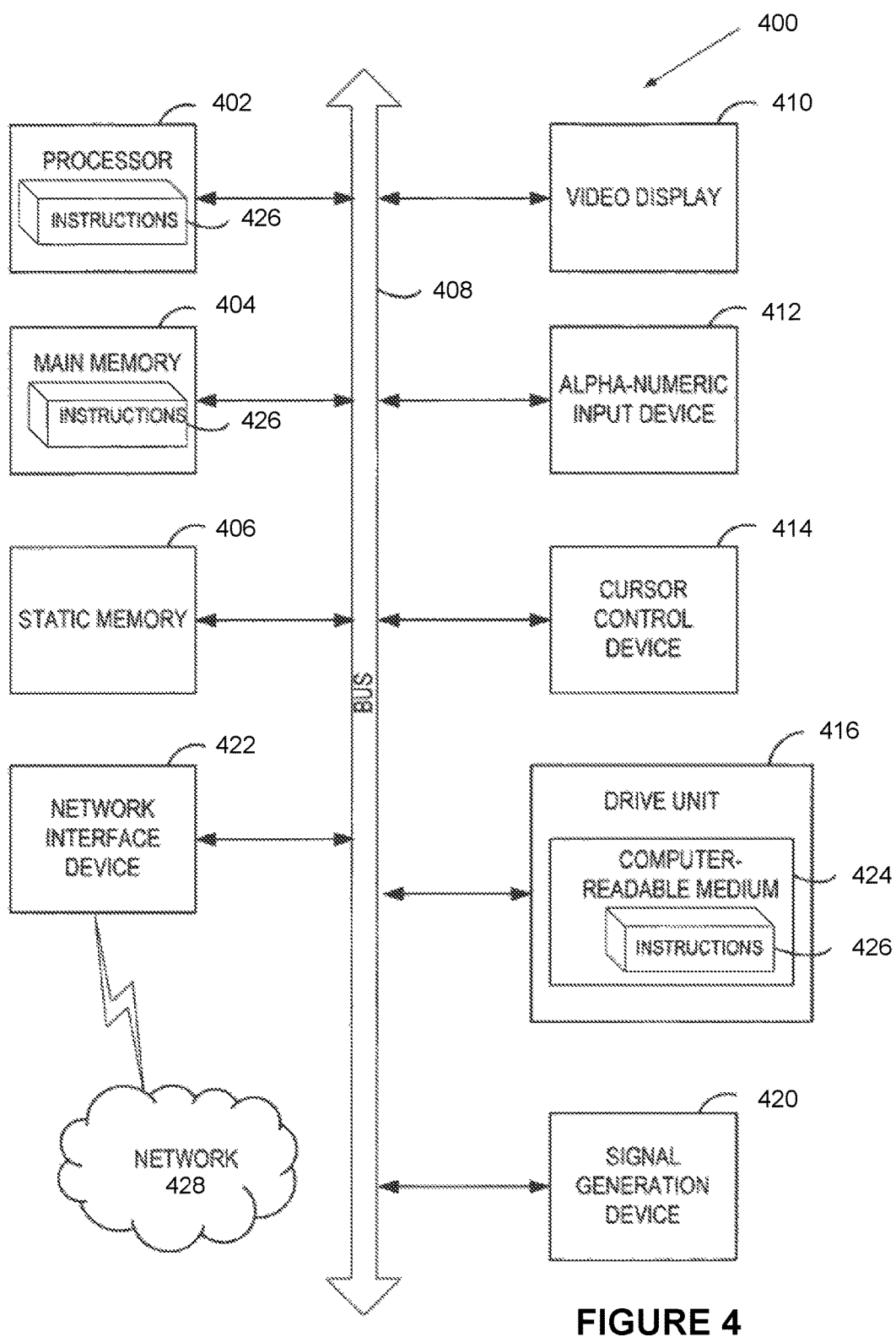
FIG. 4 is a schematic diagram showing a diagrammatic representation of a machine in the exemplary form of a computer system according to an embodiment of the invention.

FIG. 4 shows a diagrammatic representation of machine in the exemplary form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, an access point, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU), a graphics processing unit (GPU) or both), a main memory 404 (e.g., read only memory (ROM), flash memory, dynamic random access memory (DRAM) such as synchronous DRAM (SDRAM) or Rambus DRAM (RDRAM), etc.) and a static memory 406 (e.g., flash memory, static random access memory (SRAM), etc.), which communicate with each other via a bus 408.

The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 420 (e.g., a speaker) and a network interface device 422.

The disk drive unit 416 includes a computer-readable medium 424 on which is stored one or more sets of instructions (e.g., software 426) embodying any one or more of the methodologies or functions described herein. The software 426 may also reside, completely or at least partially, within the main memory 404 and/or within the processor 402 during execution thereof by the computer system 400, the main memory 404 and the processor 402 also constituting computer-readable media.

The software 426 may further be transmitted or received over a network 428 via the network interface device 422.

While the computer-readable medium 424 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, and optical and magnetic media.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

It should be understood that components described herein include computer hardware and/or executable software code which is stored on a computer-readable medium for execution on appropriate computing hardware.

The terms "computer-readable medium" or "machine readable medium" should be taken to include a single medium or multiple media that store the one or more sets of instructions. The terms "computer-readable medium" or "machine readable medium" shall also be taken to include any non-transitory storage medium that is capable of storing, encoding or carrying a set of instructions for execution by a machine and that cause a machine to perform any one or more of the methodologies described herein. The terms "computer-readable medium" or "machine readable medium" shall accordingly be taken to include, but not be limited to, solid-state memories, and optical and magnetic media. For example, "computer-readable medium" or "machine readable medium" may include Compact Disc Read-Only Memory (CD-ROMs), Read-Only Memory (ROMs), Random Access Memory (RAM), and/or Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A mobile communication device comprising: a program storage memory for storing program execution code, wherein the program execution code includes an application (APP) builder program, wherein the APP builder program is configured to:

receive a search request from a user of the mobile device, retrieve search parameters from the search request, create a contextualized search criteria by combining the retrieved search parameters and a saved customer preference data, create a temporary container for mobile applications identified using the contextualized search criteria, and combine the contextualized search criteria with a location information to define a set of brand and product portals to selectively download APPs comprising logos and optical tokens from a defined set of brand and product portals into the temporary container for enabling user access to identified applications identified using an expanded search related to the search request initiated by the user of the mobile communication device, generate a consumer preference storage area in the program storage memory to store consumer preference data for the user of the mobile device, and
collect and compile consumer preference data of the user in the consumer preference storage area:
a data storage memory for storing the saved customer preference data and configuration information generated during execution of the APP builder program;
a communication module and a wireless connection communicatively coupled to the communication module; and
a processor communicatively coupled to the program storage memory and the data storage memory, the processor configured to execute the program execution code.

2. The mobile communication device of claim 1, further comprising a display buffer and a display, wherein the display buffer is communicatively coupled to the display.

3. The mobile communication device of claim 1, further comprising a location identification unit for identifying the location of the mobile communication device.

4. The mobile communication device of claim 1, further comprising an I/O module for receiving input from a user and providing output to the user.

5. The mobile communication device of claim 1, further comprising a common high-speed bus system, wherein the common high-speed bus system communicably couples the component units of the mobile communication device.

6. A method for downloading an APP builder program to a mobile handheld communication device comprising:
connecting to an APP supplier;
downloading the APP builder program from the APP supplier to the mobile handheld communication device;
storing the APP builder program into memory of the mobile handheld communication device;
executing and instantiating the APP builder program, wherein the APP builder program is configured to:
receive a customer search request, retrieve search parameters from the customer search request, generate a contextualized search criteria by combining the retrieved search parameters and a saved customer preference data saved on a data storage memory of the device,
create a temporary container for mobile applications on the mobile handheld communication device, and
selectively download applications related to expanded search using the contextualized search criteria based on the customer search request, wherein the mobile applications comprise logos and optical tokens, and
wherein the logos and optical tokens are presented to the user of the mobile handheld communication device to provide the expanded search to the user based on the customer search request,
generate a consumer preference storage area in memory to store consumer preference data for a user of the mobile handheld communication device: and
collect and compiling consumer preference data of the user using the APP builder program.

7. The method of claim 6, further comprising:
storing the consumer preference data of the user in the consumer preference storage area.

8. The method of claim 6, further comprising pre-allocating a temporary memory space for use during search activity by the user.

9. The method of claim 8, wherein the temporary memory space is an APP container space.

10. The method of claim 6, wherein the connecting to the APP supplier is over a wireless connection.

11. The method of claim 6, wherein the APP builder program is stored in program storage memory.

12. The method of claim 7, further comprising continuously updating the consumer preference data stored in the consumer preference storage area.

13. The method of claim 12, wherein the updating is done based on user inputs and current and historic actions of the user.

14. A method comprising:
receiving search input by the user, wherein the search input comprises at least one of a picture, visual product scan, service token scan or a brand logo scan;
establishing a temporary application (APP) container;
connecting to a web portal corresponding to a supplier related to the search input;
downloading a website corresponding to the supplier from the web portal;
displaying the website on the display screen of the mobile handheld communication device;
retrieving search parameters from the search input;
combining retrieved search parameters from the search input with locally saved customer preference data to generate a contextualized search criteria;
combining the contextualized search criteria with location information of the user to identify a set of brand and product portals;
connecting to the set of brand and product portals;
requesting APPS that satisfy the contextualized search criteria to be downloaded from the set of brand and product portals into the temporary APP container location;
presenting logos and tokens from the downloaded APPs to the user to enable an expanded search capability to the user that meets the search parameters; and
collecting and compiling consumer preference data of the user.

15. The method of claim 14, further comprising allowing the user to use the APPs presented to the user from the temporary APP container location once the search is completed by the user.

16. The method of claim 15, further comprising updating the customer preference data using the search parameters.

17. The method of claim 14, further comprising deleting the data in the temporary APP container after the search is completed.

18. The method of claim 14, further comprising storing the consumer preference data in memory.

* * * * *